United States Patent
Jin et al.

(10) Patent No.: US 9,437,885 B2
(45) Date of Patent: Sep. 6, 2016

(54) FUEL CELL STACK

(71) Applicant: Hyundai Motor Company, Seoul (KR)

(72) Inventors: Sang Mun Jin, Gyeonggi-do (KR); Yoo Chang Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 241 days.

(21) Appl. No.: 14/102,008

(22) Filed: Dec. 10, 2013

(65) Prior Publication Data

US 2014/0170521 A1  Jun. 19, 2014

(30) Foreign Application Priority Data

Dec. 18, 2012  (KR) .................. 10-2012-0148753

(51) Int. Cl.
| | |
|---|---|
| *H01M 2/18* | (2006.01) |
| *H01M 8/04* | (2016.01) |
| *H01M 8/24* | (2016.01) |
| *H01M 8/10* | (2016.01) |

(52) U.S. Cl.
CPC ......... *H01M 8/04089* (2013.01); *H01M 8/248* (2013.01); *H01M 8/2415* (2013.01); *H01M 8/2485* (2013.01); *H01M 2008/1095* (2013.01); *Y02E 60/50* (2013.01)

(58) Field of Classification Search
CPC ......... H01M 8/04089; H01M 8/2415; H01M 8/248; H01M 8/2485
See application file for complete search history.

(56) References Cited

U.S. PATENT DOCUMENTS

| | | | | |
|---|---|---|---|---|
| 6,770,396 | B2* | 8/2004 | Hatoh .................. | H01M 8/0221 429/437 |
| 2008/0131755 | A1* | 6/2008 | Lee ..................... | H01M 8/0247 429/434 |
| 2010/0062289 | A1* | 3/2010 | Christie .............. | H01M 8/0258 429/434 |
| 2010/0291458 | A1* | 11/2010 | Takeyama ........... | H01M 8/2485 429/458 |
| 2012/0034545 | A1* | 2/2012 | Yamaura ........... | H01M 8/04201 429/460 |
| 2013/0004876 | A1* | 1/2013 | Suzuki ............. | H01M 8/04007 429/434 |

FOREIGN PATENT DOCUMENTS

| | | | |
|---|---|---|---|
| JP | 2004146303 A | * | 5/2004 |
| JP | 2007-280896 A | | 10/2007 |

OTHER PUBLICATIONS

Machine translation of JP 2004-146303 A.*

* cited by examiner

*Primary Examiner* — Jonathan Jelsma
(74) *Attorney, Agent, or Firm* — Mintz Levin Cohn Ferris Glovsky and Popeo, P.C.; Peter F. Corless

(57) ABSTRACT

A fuel cell stack is provided that includes unit cells that include a manifold, an open end plate that is disposed at one side of the unit cells and that has a reaction gas inlet and outlet that are connected to the manifold, and a closed end plate that is disposed at the other side of the unit cells and that closes the manifold. In particular, the open end plate includes a first slanted surface that adjusts a flow of a reaction gas at a reaction gas inlet and a manifold interface. A first alignment protrusion forms the first slanted surface and that aligns the unit cells, and the closed end plate includes a second slanted surface that adjusts flow of a reaction gas at the manifold interface. Additionally, a second alignment protrusion forms the second slanted surface and aligns the unit cells accordingly.

18 Claims, 2 Drawing Sheets

FUEL CELL STACK

CROSS-REFERENCE TO RELATED APPLICATION

This application claims priority to and the benefit of Korean Patent Application No. 10-2012-0148753 filed in the Korean Intellectual Property Office on Dec. 18, 2012, the entire contents of which are incorporated herein by reference.

BACKGROUND (a) Field of the Invention

The present invention relates to a fuel cell stack. More particularly, the present invention relates to a fuel cell stack that improves a distribution deviation of a reaction gas of unit cells.

(b) Description of the Related Art

In general, a fuel cell system is a kind of electric generation system that generates electrical energy through an electrochemical reaction of a fuel (e.g., hydrogen) and an oxidant (e.g., oxygen). As the need for environmentally friendly vehicles grows, fuel cells have begun to be implemented in the vehicles as an alternate source of energy. These types of vehicles are known in the industry as fuel cell vehicles.

One type of fuel cell is a hydrogen fuel cell system, this type of fuel cell system includes a fuel cell stack, a hydrogen supply unit that supplies hydrogen to the fuel cell stack, an air supply unit that supplies air to the fuel cell stack, and a heat/water management device that removes water and a reaction heat of the fuel cell stack. This heat/water management device also controls the operation temperature of the fuel cell stack.

The fuel cell stack is formed as an electrical generator unit or stack in which tens to hundreds of unit cells are consecutively arranged. In this configuration, unit cells are defined by separators on both sides thereof and provided with a membrane-electrode assembly (MEA) interposed therebetween the separators.

Additionally, once a sufficient number of unit cells are stacked together, end plates are installed on the outermost ends (both sides) of the consecutively stacked unit cells. These end plates press attach to the outermost unit cell and press the plurality of unit cells together to form the fuel cell stack.

Furthermore, at a separator of unit cells, a manifold for supplying and exhausting a reaction gas (e.g., hydrogen and air) and a coolant is formed. Typically, at one of end plates a reaction gas inlet and outlet that are connected to the manifold are formed as well. Therefore, any reaction gas that is supplied to the reaction gas inlet of the end plate flows along the manifold and is supplied to the unit cells accordingly, and any reaction gas that remains after being supplied to the unit cells flows along another manifold and is exhausted through the reaction gas outlet of the other end plate.

In this process, the fuel cell stack generates electrical energy through an electrochemical reaction of hydrogen and air. However, as the supply of reaction gas moves through the plurality of unit cells, a flux deviation essentially occurs in a supply fluid between unit cells. In particular, as the reaction gas recedes from the inlet side of unit cells, a reaction gas of a flux less than a reference flux may be injected into unit cells.

This distribution deviation occurs in a reaction gas because that the pressure differentials that are applied to each unit cell are the same, but as a reaction gas recedes from the inlet, an additional pressure differential that is applied to the manifold occurs.

Further, in the fuel cell stack, during initial operation, at the reaction gas inlet side, an excess amount of condensed water is generated. As such, condensed water, having a density higher than that of a reaction gas, moves toward unit cells of the reaction gas inlet side of the fuel cell stack.

Disadvantageously, a distribution deviation of a reaction gas in the fuel cell stack may cause a cell omission phenomenon in unit cells to which a reaction gas of a flux less than a reference flux is supplied or may deteriorate the durability performance of the fuel cell stack. Additionally, the supply flux of a reaction gas cannot be optimized and thus a performance of the fuel cell stack may be deteriorated as well. Further, in a reaction gas distribution structure of the fuel cell stack, flooding from condensed water within unit cells of the reaction gas inlet side may also occur.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a fuel cell stack that minimizes a distribution deviation of a reaction gas according to a position of the unit cells, improves durability and an operation performance through inflow distribution of condensed water at the reaction gas inlet side, and improves productivity according to stacking of unit cells.

An exemplary embodiment of the present invention provides a fuel cell stack including: unit cells that each include a manifold; and a first end plate that is disposed at an outermost end of the unit cells. More specifically, the end plate for pair of end plates (one on each end of the stack)) is disposed so as to press the unit cells together, and includes at least one of a first and a second slanted surface that adjusts a flow of a reaction gas at a first manifold interface.

The first end plate may be disposed on one outermost side of the unit cells as an open end plate in which a reaction gas inlet and outlet that are connected to the manifold are formed. Additionally, a second end plate that is disposed at the other outermost side of the unit cells may be provided as a closed end plate that closes the manifold.

In some exemplary embodiments of the present invention, the first slanted surface may be formed in at least one of an upper side and a lower side of the reaction gas inlet in the first end plate. Likewise the second end plate may include the second slanted surface for adjusting flow of a reaction gas at a manifold interface. As such, the first end plate may form the first slanted surface and include a first alignment protrusion that aligns the unit cells. The second end plate may form the second slanted surface and include a second alignment protrusion that aligns the unit cells.

Furthermore, in some exemplary embodiments, the first and second alignment protrusions may include a support surface that supports the unit cells. These first and second alignment protrusions may adjust flow of a reaction gas together with the respective first slanted surface and second slanted surface.

Even further in some exemplary embodiments, the first slanted surface may be slanted upward toward the manifold interface side of the first end plate at the inlet terminal side of the reaction gas inlet. The second slanted surface, on the other hand, may gradually rise to a height thereof at a manifold interface of the second end plate. This second slanted surface may be formed as a groove at a manifold interface of the closed end plate.

In exemplary embodiments of the present invention, a distribution deviation of a reaction gas according to a position of unit cells can be minimized, inflow of condensed water at the reaction gas inlet side can be distributed, and thus durability and an operation performance of a fuel cell stack can be improved. Further, in an exemplary embodiment of the present invention, because the first and second alignment protrusions are formed in the first end plate and the second end plate, respectively, a relative position of outermost unit cells is restricted and the unit cell may be aligned and thus productivity according to stacking/manufacturing of unit cells can be enhanced.

Furthermore, in an exemplary embodiment of the present invention, because flow of a reaction gas can be adjusted together with the respective first slanted surface and second slanted surface through a first alignment protrusion and a second alignment protrusion, flow of a reaction gas that is injected into unit cells can be fully developed.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE EMBODIMENTS

Figure 1:
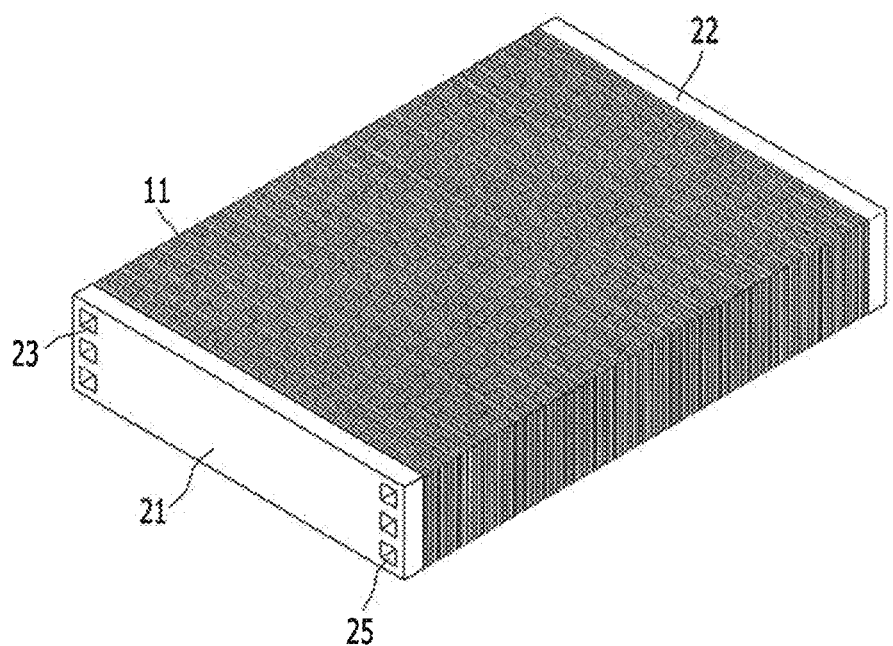
FIG. 1 is a perspective view illustrating a fuel cell stack according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, in the drawings, a size and thickness of each element are randomly represented for better understanding and ease of description, and the present invention is not limited thereto.

In a detailed description, in order to distinguish the same constituent elements, a first and a second, etc., are used as names of constituent elements and do not represent the order.

In addition, in the entire specification, unless explicitly described to the contrary, the word "comprise" and variations such as "comprises" or "comprising", will be understood to imply the inclusion of stated elements but not the exclusion of any other elements.

In addition, the terms "unit", "means", "portion", and "member" described in the specification indicate a unit of a comprehensive constituent element for performing at least one function and operation.

It is understood that the term "vehicle" or "vehicular" or other similar term as used herein is inclusive of all types of vehicles in general such as passenger automobiles m including sports utility vehicles (SUV), buses, trucks, various commercial vehicles, watercraft including a variety of boats and ships, aircraft, and the like, and includes hybrid fuel cell vehicles, plug-in hybrid fuel cell electric vehicles, hydrogen-powered fuel cell vehicles, and other alternative fuel cell vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 2:
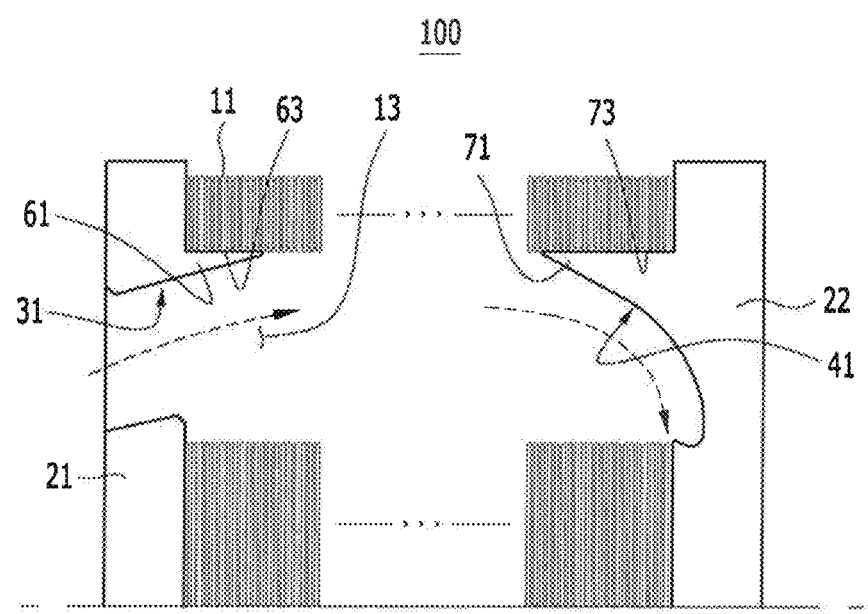
FIG. 2 is a partially cross-sectional view of a fuel cell stack according to an exemplary embodiment of the present invention.

FIG. 1 is a perspective view illustrating a fuel cell stack according to an exemplary embodiment of the present invention, and FIG. 2 is a partially cross-sectional view of a fuel cell stack according to an exemplary embodiment of the present invention.

Referring to FIGS. 1 and 2, a fuel cell stack 100 according to an exemplary embodiment of the present invention is an electricity generator set of unit cells 11 that generate electrical energy through an electrochemical reaction of hydrogen, which is fuel and air, which is an oxidizing agent.

Hereinafter, hydrogen and air that are supplied to the fuel cell stack 100 in order to generate electrical energy are defined as a reaction gas, however such fuels and reactants are not limited thereto.

The unit cells 11 are stacked consecutively in groups of tens to hundreds of unit cells depending upon the desired output, and in the unit cells 11, a manifold 13 for supply and exhaust of a reaction gas is formed.

Here, in the unit cells 11, a manifold for supplying a coolant is also provided, but a manifold that is described in an exemplary embodiment of the present invention refers to the manifold that supplies and exhausts a reaction gas, not the manifold that supplies the coolant.

At the outermost end (both sides) of consecutively stacked unit cells 11, end plates 21 and 22 are each disposed. The end plates 21 and 22 press the unit cells 11 therebetween at the outermost ends while being engaging by an engaging unit (not shown).

In an exemplary embodiment of the present invention, a first end plate that is disposed at one side of the unit cells 11 is referred to as an open end plate 21, and a second end plate that is disposed at the other side of the unit cells 11 is referred to as a closed end plate 22. This is because the open end plate 21 includes a reaction gas inlet 23 and a reaction gas outlet 25 that are connected to the manifold 13 of the unit cells 11, and the closed end plate 22 closes the manifold 13 of the unit cells 11.

In an exemplary embodiment of the present invention, the fuel cell stack 100 that is formed in this way can minimization a distribution deviation of a reaction gas according to a position of the unit cells 11 and may be formed in a structure that can improve an operation performance and durability through inflow distribution of condensed water at the reaction gas inlet side.

Further, the fuel cell stack 100 may be formed in a structure that can improve productivity according to stacking of the unit cells 11. For this purpose, in the fuel cell stack 100 according to an exemplary embodiment of the present invention, the open end plate 21 includes a first slanted surface 31, and the closed end plate 22 includes a second slanted surface 41.

In order to prevent concentration inflow of condensed water and reaction gas flux supercharge of the unit cells 11 of the reaction gas inlet 23 side, the first slanted surface 31 adjusts the flow of a reaction gas at a manifold interface and the reaction gas inlet 23 of the open end plate 21.

The first slanted surface 31 may be formed at one of an upper side and a lower side of the reaction gas inlet 23 based on a height direction in the open end plate 21, and a position of the first slanted surface 31 is not limited thereto and the first slanted surfaces 31 may each be formed at the upper side and the lower side of the reaction gas inlet 23.

For example, the first slanted surface 31 may be formed to be slanted upward toward the manifold interface side of the open end plate 21 at the inlet terminal side of the reaction gas inlet 23.

In order to prevent flux shortage of a reaction gas due to an extreme shape change at an interface of the outermost unit cell 11 and the closed end plate 22, the second slanted surface 41 adjusts flow of a reaction gas at a manifold interface of the closed end plate 22.

The second slanted surface 41 may be formed to gradually raise a height thereof at a manifold interface of the closed end plate 22. For example, the second slanted surface 41 may be formed as a groove of a round form at the manifold interface of the closed end plate 22.

The open end plate 21 includes a first alignment protrusion 61, and the closed end plate 22 includes a second alignment protrusion 71. The first alignment protrusion 61 forms the first slanted surface 31 that is described above and aligns the unit cells 11 at the reaction gas inlet side, and may be used as a first alignment reference portion of the unit cells 11, when manufacturing a stack. The first alignment protrusion 61 also may form a support surface 63 that supports the unit cells 11 at the reaction gas inlet side at the inside of the manifold 13 of the unit cells 11.

The second alignment protrusion 71 forms a second slanted surface 41 that is described above and aligns the unit cells 11 at the manifold close terminal side and may be used as a second alignment reference portion of the unit cells 11, when manufacturing a stack. Likewise, the second alignment protrusion 71 also forms a support surface 73 that supports the unit cells 11 at the manifold close terminal side at the inside of the manifold 13 of the unit cells 11.

In practice, the first alignment protrusion 61 and the second alignment protrusion 71 may adjust flow of a reaction gas together with the respective first slanted surface 31 and second slanted surface 41. That is, in order to fully develop flow of a reaction gas, the first and second alignment protrusions 61 and 71 are protruded toward a cell surface of the unit cells 11.

As such, the open end plate 21 and the closed end plate 22 may be divided into a metal portion for collecting electricity that is generated in the unit cells 11 and maintaining rigidity, and an outer cover portion that encloses the metal portion. The outer cover portion may be produced by injecting a polymer material such as plastic for electric insulation.

Accordingly, the open end plate 21 and the closed end plate 22 that are described in the foregoing description may be simply produced only with an injection mold change of an outer cover portion without adding a separate process. Additionally, in the fuel cell stack 100 according to an exemplary embodiment of the present invention having the above-described configuration, because the first slanted surface 31 is formed in the open end plate 21, concentration inflow of condensed water and reaction gas flux supercharge of the unit cells 11 of the reaction gas inlet 23 side can be prevented.

Further, in an exemplary embodiment of the present invention, because the second slanted surface 41 is formed in the closed end plate 22, flux shortage of a reaction gas due to an extreme shape change at an interface of the outermost unit cell 11 and the closed end plate 22 can be prevented. That is, in an exemplary embodiment of the present invention, as the reaction gas recedes from an inlet side of the unit cells 11, a reaction gas of a flux less than a reference flux can be prevented from being injected into the unit cells 11.

As such, in an exemplary embodiment of the present invention, as distribution deviation of a reaction gas can be minimized according to a position of the unit cells 11, inflow of condensed water at the reaction gas inlet side can be distributed, and thus durability and an operation performance of the fuel cell stack 100 can be improved.

In an exemplary embodiment of the present invention, because the first alignment protrusion 61 and the second alignment protrusion 71 are formed in the open end plate 21 and the closed end plate 22, respectively, a relative position of the outermost unit cells 11 is restricted, and the unit cells 11 can be aligned, and thus productivity according to stacking of the unit cells 11 can be improved.

Furthermore, in an exemplary embodiment of the present invention, because flow of a reaction gas can be adjusted together with the respective first slanted surface 31 and second slanted surface 41 through the first alignment protrusion 61 and the second alignment protrusion 71, flow of a reaction gas that is injected into the unit cells 11 may be fully developed.

Finally, in an exemplary embodiment of the present invention, because the open end plate 21 and the closed end plate 2 can be formed with merely correction of an injection mold of an outer cover portion without an additional process, an end plate can be simply produced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

11 . . . unit cell
13 . . . manifold
21 . . . open end plate
22 . . . closed end plate
23 . . . reaction gas inlet
25 . . . reaction gas outlet
31 . . . first slanted surface
41 . . . second slanted surface
61 . . . first alignment protrusion
63, 73 . . . support surface
71 . . . second alignment protrusion

What is claimed is:

1. A fuel cell stack, comprising:
   unit cells that are stacked together and form a manifold;
   a first end plate that is disposed at an outermost end of the unit cells, the first end plate being an open end plate in which a reaction gas inlet and outlet that is connected to the manifold of the first end plate are formed;
   a second end plate that is disposed at an opposing outermost end of the unit cells, the second end plate being a closed end plate that closes the manifold; and
   a reaction gas that flows into the reaction gas inlet through a first slanted surface of the first end plate, wherein the first slanted surface widens the manifold from the first end plate toward an interior of the stacked unit cells to adjust a flow of the reaction gas at a manifold interface of the first end plate and to minimize distribution deviation,
   wherein the first and second end plate press against the unit cells.

2. The fuel cell stack of claim 1, wherein the first slanted surface is formed in at least one of an upper side and a lower side of the reaction gas inlet based on a height direction in the first end plate.

3. The fuel cell stack of claim 1, wherein the second end plate includes a second slanted surface that narrows the manifold from the interior of the stacked unit cells toward the second end plate to adjust the flow of a reaction gas at the manifold interface of the second end plate.

4. The fuel cell stack of claim 3, wherein the second slanted surface gradually rises to a height thereof at the manifold interface of the second end plate.

5. The fuel cell stack of claim 4, wherein the second slanted surface is formed as a groove at the manifold interface of the second end plate.

6. The fuel cell stack of claim 1, wherein the first end plate includes a first alignment protrusion that protrudes into the manifold to align the unit cells, and the first slanted surface is formed at the first alignment protrusion.

7. The fuel cell stack of claim 6, wherein the second end plate includes a second alignment protrusion that protrudes into the manifold to align the unit cells, and the second slanted surface is formed at the second alignment protrusion.

8. The fuel cell stack of claim 7, wherein the first and second alignment protrusions respectively include a support surface that supports the unit cells.

9. The fuel cell stack of claim 7, wherein the first slanted surface is formed at an opposite side of the support surface of the first alignment protrusion, and the second slanted surface is formed at an opposite side of the support surface of the second alignment protrusion.

10. The fuel cell stack of claim 1, wherein the first slanted surface is slanted upward toward the manifold interface side of the first end plate at an inlet terminal side of the reaction gas inlet.

11. A pair of end plates for a fuel cell stack that press together a plurality of unit cells, the pair of end plates comprising;
    a first end plate, being disposed at an outermost end of the plurality of unit cells, is an open end plate in which a reaction gas inlet and outlet that is connected to the manifold are formed; and
    a second end plate that is disposed at an opposing outermost end of the unit cells is provided as a closed end plate that closes the manifold,
    wherein a reaction gas flows into the reaction gas inlet through a first slanted surface of the first end plate, wherein the first slanted surface widens the manifold from the first end plate toward an interior of the stacked unit cells to adjust a flow of the reaction as at a manifold interface of the first end plate and to minimize distribution deviation.

12. The pair of end plates of claim 11, wherein the first slanted surface is formed in at least one of an upper side and a lower side of the reaction gas inlet based on a height direction in the first end plate.

13. The pair of end plates of claim 11, wherein the second end plate includes a second slanted surface that narrows the manifold from the interior of the stacked unit cells toward the second end plate to adjust the flow of a reaction gas at a manifold interface of the second end plate.

14. The pair of end plates of claim 11, wherein the first end plate includes a first alignment protrusion that protrudes into the manifold to align the unit cells, and the first slated surface is formed at the first alignment protrusion.

15. The pair of end plates of claim 14, wherein the second end plate includes a second alignment protrusion that protrudes into the manifold to align the unit cells, and the second slanted surface is formed at the second alignment protrusion.

16. The pair of end plates of claim 15, wherein the first and second alignment protrusions respectively include a support surface that supports the unit cells.

17. The pair of end plates of claim 15, wherein the first slanted surface is formed at an opposite side of the support surface of the first alignment protrusion, and the second slanted surface is formed at an opposite side of the support surface of the second alignment protrusion.

18. The pair of end plates of claim 11, wherein the first slanted surface is slanted upward toward the manifold interface side of the first end plate at an inlet terminal side of the reaction gas inlet.

* * * * *